(12) United States Patent
Yamazaki

(10) Patent No.: US 6,999,137 B2
(45) Date of Patent: *Feb. 14, 2006

(54) REFLECTION TYPE SEMICONDUCTOR DISPLAY DEVICE

(75) Inventor: Shunpei Yamazaki, Tokyo (JP)

(73) Assignee: Semiconductor Energy Laboratory Co., Ltd., (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/895,009

(22) Filed: Jul. 20, 2004

(65) Prior Publication Data

US 2004/0257503 A1    Dec. 23, 2004

Related U.S. Application Data

(63) Continuation of application No. 10/127,854, filed on Apr. 23, 2002, now Pat. No. 6,784,952, which is a continuation of application No. 09/407,796, filed on Sep. 29, 1999, now Pat. No. 6,407,785.

(30) Foreign Application Priority Data

Oct. 5, 1998    (JP)    ................................ 10-282302

(51) Int. Cl.
    *G02F 1/1335*    (2006.01)
(52) U.S. Cl. ........................ 349/63; 349/113; 349/95
(58) Field of Classification Search ................ 349/113, 349/63, 95; 385/147, 901
See application file for complete search history.

(56) References Cited

U.S. PATENT DOCUMENTS

| | | | |
|---|---|---|---|
| 4,212,048 A | 7/1980 | Castleberry | .................. 362/19 |
| 4,911,536 A | 3/1990 | Ditzik | ........................ 350/351 |
| 5,101,325 A | 3/1992 | Davenport et al. | ........... 362/31 |
| 5,121,232 A | 6/1992 | Miyadera | ...................... 359/49 |
| 5,181,130 A | 1/1993 | Hubby, Jr. | .................... 359/42 |
| 5,329,386 A | 7/1994 | Birecki et al. | ................ 359/42 |
| 5,506,705 A * | 4/1996 | Yamamoto et al. | ........... 349/13 |
| 5,542,016 A * | 7/1996 | Kaschke | ..................... 385/123 |
| 5,680,186 A * | 10/1997 | Watanabe et al. | ............. 349/95 |
| 5,682,215 A | 10/1997 | Nishihara et al. | ............. 349/95 |
| 5,706,066 A | 1/1998 | Sawayama et al. | ......... 349/113 |
| 5,760,852 A | 6/1998 | Wu et al. | ..................... 349/14 |
| 5,765,934 A | 6/1998 | Okamori et al. | .............. 353/94 |

(Continued)

FOREIGN PATENT DOCUMENTS

| | | |
|---|---|---|
| DE | 3314323 | 10/1984 |
| EP | 056 843 A2 | 8/1982 |
| GB | 2 246 231 | 1/1992 |

OTHER PUBLICATIONS

Patent Abstracts of Japan, vol. 016, No. 197, May 12, 1992 (P-1350) re publication No. JP 04029291, published Jan. 31, 1992.

(Continued)

*Primary Examiner*—Robert Kim
*Assistant Examiner*—Mike Qi
(74) *Attorney, Agent, or Firm*—Cook, Alex, McFarron, Manzo, Cummings & Mehler, Ltd.

(57) ABSTRACT

A reflection type semiconductor display device which can make satisfactory display even when external light is not satisfactorily intense is provided. A reflection type semiconductor display device according to the present invention can take in light other than incident light on a liquid crystal panel to be an auxiliary light source using optical fibers, and thus, display of high quality level can be made even indoors or in a place where light is faint. Further, by combining the semiconductor display device with a front light, insufficient amount of light can be supplemented with the front light.

49 Claims, 11 Drawing Sheets

U.S. PATENT DOCUMENTS

| | | | |
|---|---|---|---|
| 5,857,761 A | 1/1999 | Abe et al. | 362/32 |
| 5,886,760 A | 3/1999 | Ueda et al. | 349/95 |
| 5,930,044 A | 7/1999 | Schleipen | 359/573 |
| 5,982,540 A | 11/1999 | Koike et al. | 359/487 |
| 6,151,089 A * | 11/2000 | Yang et al. | 349/113 |
| 6,407,785 B1 * | 6/2002 | Yamazaki | 349/113 |
| 6,784,952 B1 * | 8/2004 | Yamazaki | 349/63 |

OTHER PUBLICATIONS

European Search Report for application No. EP 99 11 8795, dated May 3, 2000.

* cited by examiner

Fig. 1
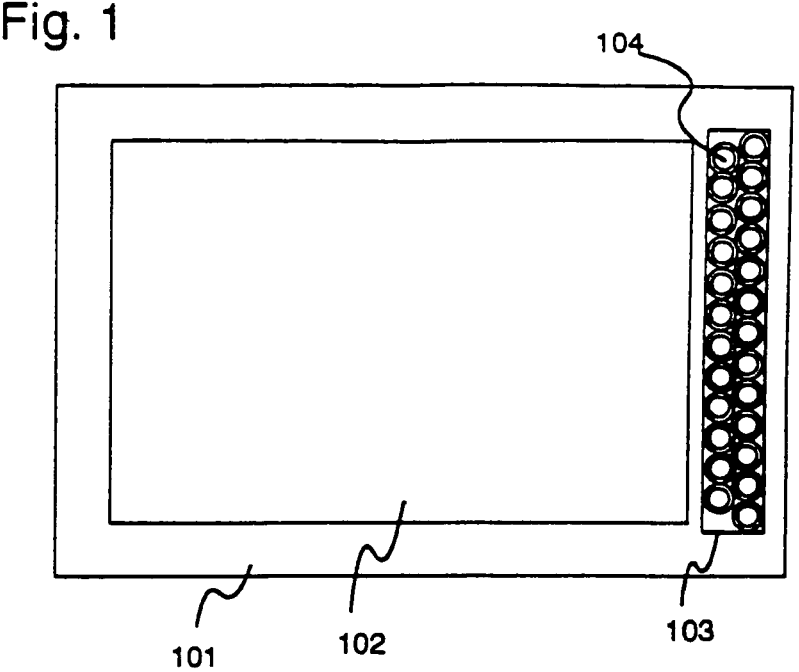
Fig. 2A  Fig. 2B
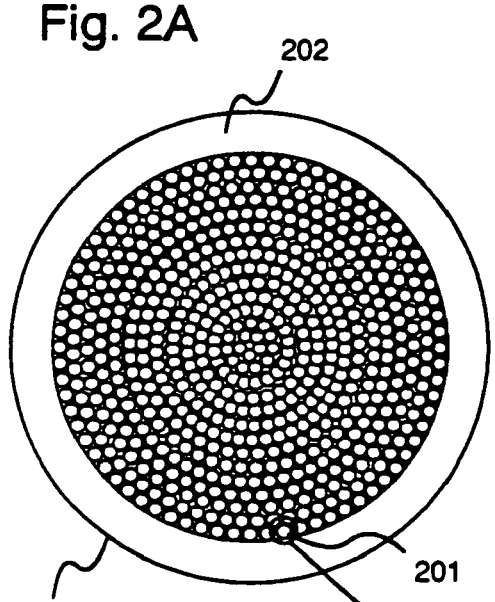
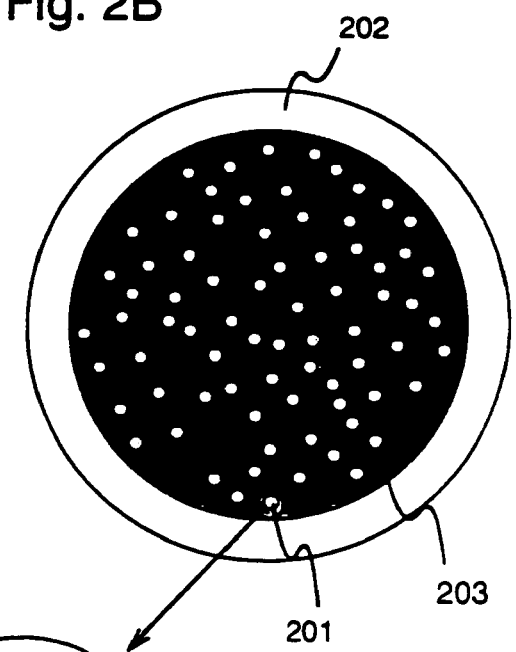
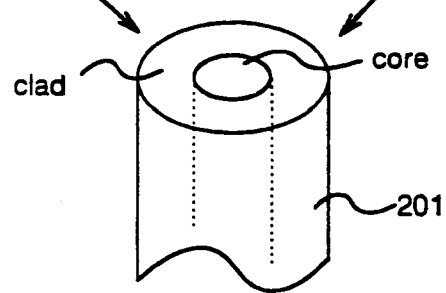

803
802
801
804

803-1
802

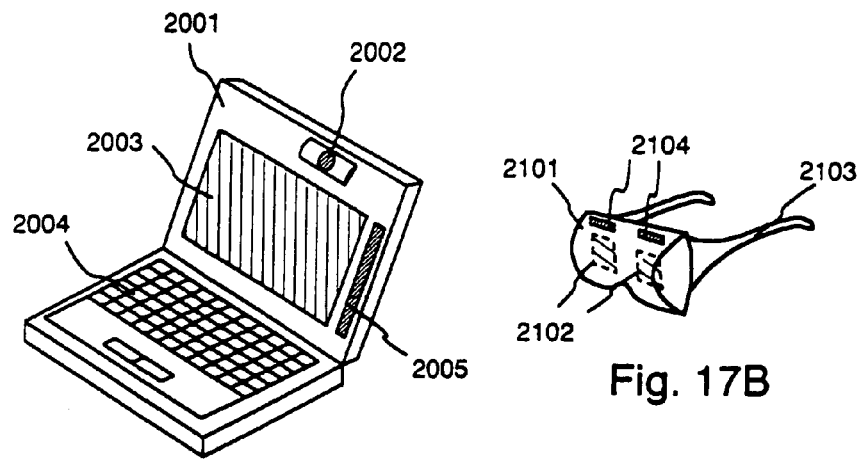
Fig. 17A
Fig. 17B
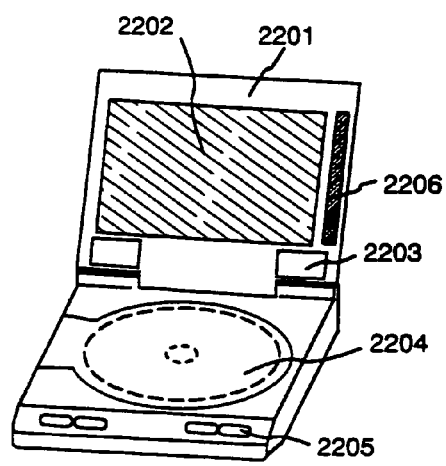
Fig. 17C
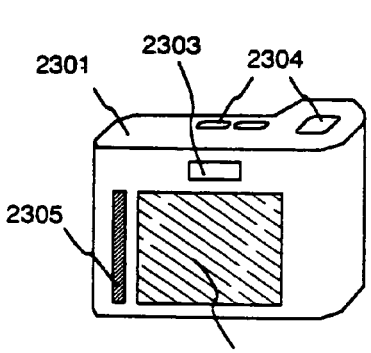
Fig. 17D
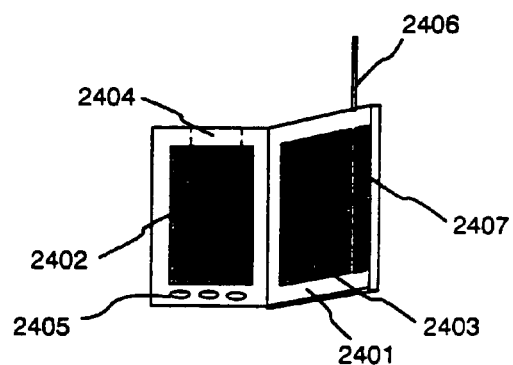
Fig. 17E

REFLECTION TYPE SEMICONDUCTOR DISPLAY DEVICE

CROSS-REFERENCE TO RELATED APPLICATIONS

This is a continuation of U.S. application Ser. No. 10/127,854, filed Apr. 23, 2002 now U.S. Pat. No. 6,784,952, which is a continuation of U.S. patent application Ser. No. 09/407,796, filed Sep. 29, 1999, now U.S. Pat. No. 6,407,785 and claims priority to Japanese patent application JP 10-282302, filed Oct. 5, 1998.

BACKGROUND OF THE INVENTION

1. Field of the Invention

The present invention relates to a reflection type semiconductor display device of a direct viewing type, and more particularly, to a reflection type liquid crystal display device (liquid crystal panel). The present invention also relates to a semiconductor device with a reflection type liquid crystal display device mounted thereon.

A semiconductor device as referred to in the present invention may be, for example, information processing equipment such as a notebook-sized personal computer, a lap top type personal computer, an electronic notebook, or a mobile computer, a video camera, a digital still camera, a car navigation system, or a cellular telephone.

2. Description of the Related Art

Recently, an intensive study and development have been carried out with regard to manufacturing technology of liquid crystal panels to make it possible to provide liquid crystal panels at a relatively low cost. Further, as the information society where Internet, electronic mail, and the like are utilized has been developed, notebook-sized personal computers (hereinafter abbreviated as notebook-sized PCs) have rapidly become more popular.

With regard to digital still cameras and video cameras, as they have been allowed to have liquid crystal panels mounted thereon such that images taken can be viewed on the spot, they have become widely accepted by consumers.

Liquid crystal panels fall into transmission type ones and reflection type ones. In a transmission type liquid crystal panel, illumination light is transmitted through the liquid crystal panel from a back light provided at the back so that the user can visually confirm the display. On the other hand, a reflection type liquid crystal panel does not need a back light, and the display can be seen through reflection of external light on the liquid crystal panel. Such a back light consumes about 90% of power consumption of the transmission type liquid crystal panel, and thus, power consumption of a transmission type liquid crystal panel is large. On the other hand, though the display quality level of a reflection type liquid crystal panel is inferior to that of a transmission type liquid crystal panel, power consumption of a reflection type liquid crystal panel is smaller than that of a transmission type liquid crystal panel, and thus, a reflection type liquid crystal panel is advantageous when used in a notebook-sized PC or a mobile PC.

One reason of the inferiority of the display quality level of a reflection type liquid crystal panel to that of a transmission type liquid crystal panel could be the insufficient amount of light when it is used indoors.

These days, in order to solve the problem of the insufficient amount of light, a technique to provide a reflection type liquid crystal panel with a front light is adopted to supplement insufficient amount of light when it is used indoors.

However, in this case, since a fluorescent lamp similar to that used as a back light of a transmission type liquid crystal panel is used as the front light, leading to larger power consumption, the advantage of a reflection type liquid crystal panel cannot be obtained.

SUMMARY OF THE INVENTION

Accordingly, the present invention has been made in view of the above problem, and an object of the invention is to provide a reflection type semiconductor display device having high display quality level without insufficiency of the amount of light even when it is used indoors.

In order to solve the above problem, according to the present invention, light other than incident light on a liquid crystal panel is utilized as an auxiliary light source of a reflection type semiconductor display device.

FIG. 1 shows a schematic structural view of a reflection type semiconductor display device using a reflection type liquid crystal panel according to the present invention. Reference numerals 101, 102, and 103 denote a main body, a reflection type liquid crystal panel, and an optical fiber array, respectively. The optical fiber array 103 includes a plurality of optical fiber cables 104. Each of the optical fiber cables 104 is a bundle of a plurality of optical fibers, examples thereof being shown in FIGS. 2A and 2B. The optical fiber array is used as means for taking in external light.

In FIGS. 2A and 2B, reference numeral 201 denotes an optical fiber, an enlargement thereof being shown at the lower portion in FIGS. 2A and 2B. The optical fiber 201 has a core and a clad. The index of refraction of the core is larger than that of the clad, and light travels as it repeats total internal reflections at the interface between the core and the clad. A coating 202 is formed of a resin or the like. A reinforcing material 203 is formed of a resin or the like.

It is to be noted that, in the optical fiber cable 104 shown in FIG. 2A, a bundle of tightly packed optical fibers is covered with the coating 202. Further, in the optical fiber cable 104 shown in FIG. 2B, the reinforcing material 203 fills the space among the optical fibers to improve the strength.

Next, reference is made to FIG. 3. FIG. 3 shows a sectional view of a reflection type liquid crystal panel according to the present invention. Reference numeral 301 denotes a substrate. Reference numerals 302 and 303 denote driver TFTs (thin film transistors). Reference numerals 304, 305, 306, and 307 denote a pixel TFT, a reflection electrode, liquid crystal, and a counter substrate, respectively. It is to be noted that the pixel TFT can be made of amorphous semiconductor film or polycrystalline semiconductor film. Also it is to be noted that a transparent electrode (not shown) is provided under the counter substrate.

The optical fiber cables 104 are positioned such that light taken in from one end of each of the optical fiber cables 104 is emitted from the other end thereof to the counter substrate. Consequently, incident light entered into the optical fiber cables travels through the optical fibers, enters the counter substrate 307, traveling through the counter substrate 307, and then enters the liquid crystal. It is to be noted that the upper surface of the counter substrate 307 is appropriately processed to allow incident light on the liquid crystal by eliminating the requirement for the total internal reflections of light traveling through the substrate at the interface. The processing condition can be most suitably set through simulation or the like. In FIG. 3, the upper surface of the counter substrate 307 is formed with patterns, but the present invention is not limited thereto.

Alternatively, as shown in FIG. 4, the panel may be structured to use a counter substrate used in a general reflection type liquid crystal panel and a light guide plate 408. Reference numeral 401 denotes a substrate. Reference numerals 402 and 403 denote driver TFTs. Reference numerals 404, 405, 406, and 407 denote a pixel TFT, a reflection electrode, liquid crystal, and a counter substrate, respectively. In this case, the upper surface of the light guide plate 408 is processed so as to eliminate the requirement for the total internal reflections of incident light traveling through the light guide plate 408 at the interface.

It is to be noted that any suitable means may be used to allow incident light taken in by the optical fiber cables 104 to travel through the counter substrate or the light guide plate into the liquid crystal.

The present invention will be described in view of the structure.

According to the present invention, there is provided a reflection type semiconductor display device in which light emitted from one end of an optical fiber enters said reflection type semiconductor display device, wherein the light is external light taken in from the other end of the optical fiber.

Further, according to the present invention, there is provided a reflection type semiconductor display device in which light emitted from one end of an optical fiber enters a counter substrate of said reflection type semiconductor display device, wherein the light is external light taken in from the other end of the optical fiber.

Still further, according to the present invention, there is provided a reflection type semiconductor display device in which light emitted from one end of an optical fiber enters a light guide plate provided so as to oppose to said reflection type semiconductor display device, wherein the light is external light taken in from the other end of the optical fiber.

Preferably, a reflection type semiconductor display device in the foregoing structure further comprises a microlens.

Preferably, a reflection type semiconductor display device in the foregoing structure further comprises a front light.

Preferably, the above-described front light comprises an LED.

BRIEF DESCRIPTION OF THE DRAWINGS

In the accompanying drawings:

FIG. 1 is a schematic structural view of a reflection type semiconductor display device according to the present invention;

FIGS. 2A and 2B show examples of an optical fiber cable;

FIGS. 17A to 17E show further examples of a semiconductor device with a reflection type liquid crystal panel according to the present invention mounted thereon.

DETAILED DESCRIPTION OF THE PREFERRED EMBODIMENTS

Embodiments of the present invention are described in the following. It is to be noted that the present invention is not limited to the following embodiments.

[Embodiment 1]

The present embodiment is a case where a liquid crystal panel according to the present invention is mounted on a notebook-sized PC.

Figure 5:
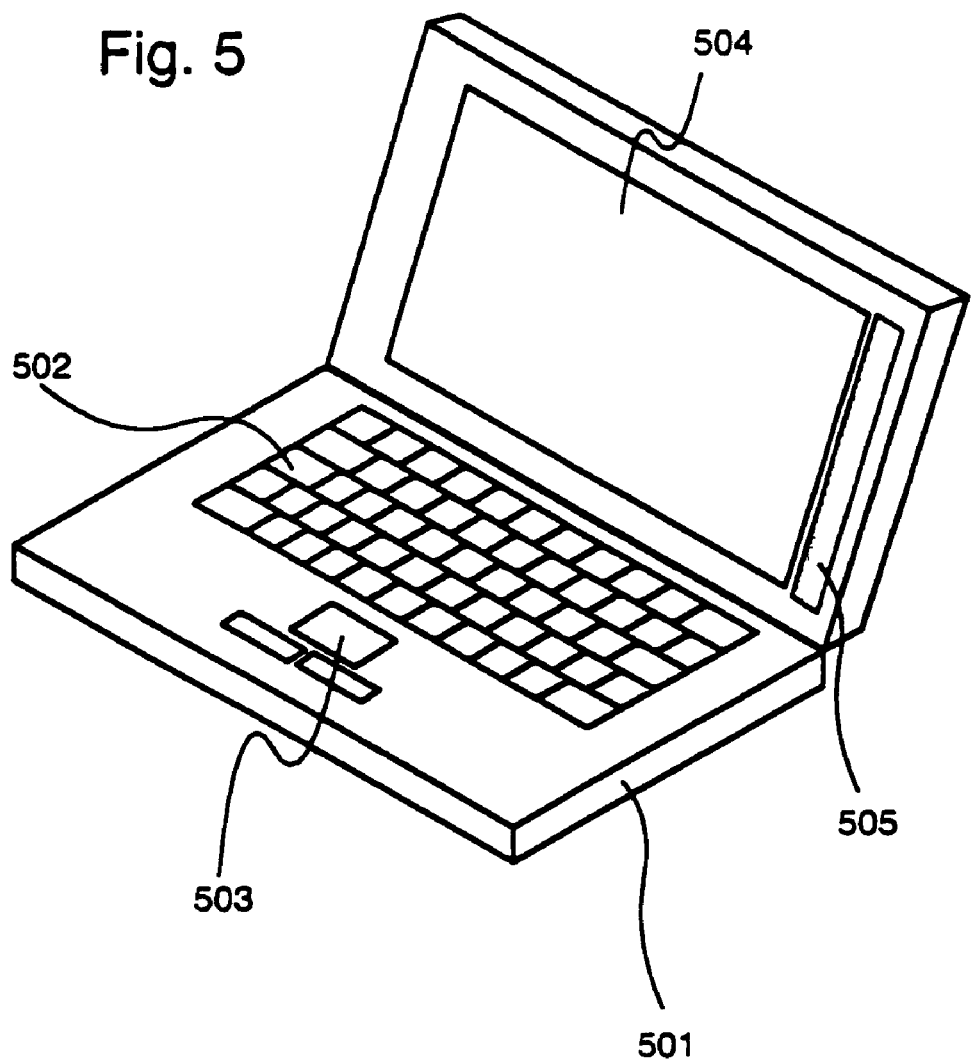
FIG. 5 is a schematic structural view of a notebook-sized PC with a reflection type liquid crystal panel according to the present invention mounted thereon.

Reference is made to FIG. 5, which shows the appearance of the notebook-sized PC of the present embodiment. Reference numerals 501, 502, 503, 504, and 505 denote a main body, a keyboard, a pointing device, a reflection type liquid crystal panel, and an optical fiber array, respectively.

Figure 6:
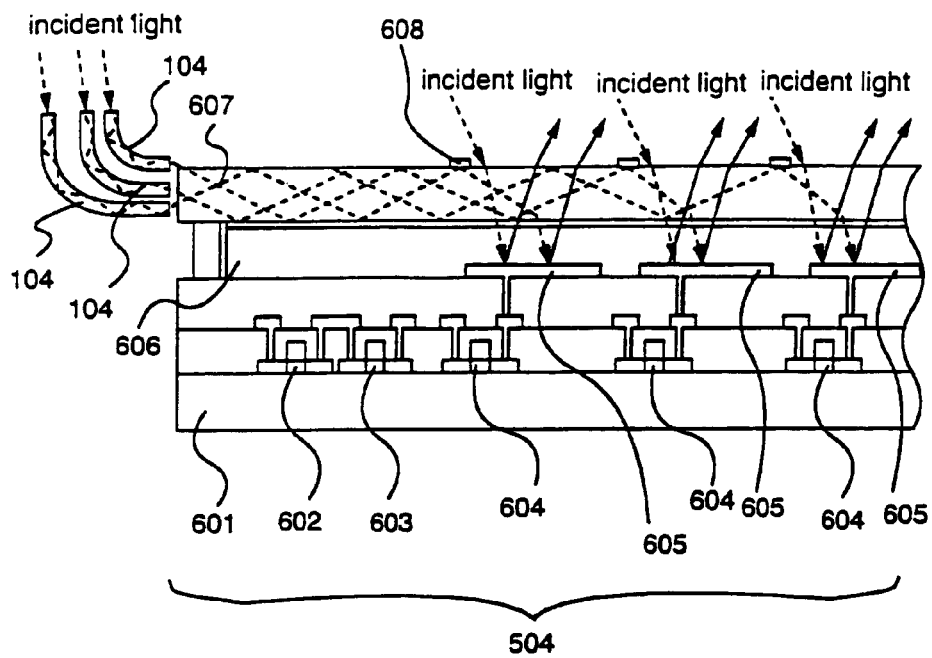
FIG. 6 is a sectional view of a reflection type liquid crystal panel according to the present invention.

The optical fiber array of the present embodiment has the optical fiber cables 104 as shown in FIG. 2A. FIG. 6 shows a sectional view of the reflection type liquid crystal panel 504 of the present embodiment. Reference numeral 601 denotes a substrate. Reference numerals 602 and 603 are driver TFTs. Reference numerals 604, 605, 606, and 607 denote a pixel TFT, a reflection electrode, liquid crystal, and a counter substrate, respectively. Dots 608 are formed on the counter substrate 607.

The optical fiber cables 104 are positioned so as to emit light taken into the counter substrate. Incident light entered into the optical fiber cables enters the counter substrate 607, traveling through the counter substrate 607, and then enters the liquid crystal 606. It is to be noted that the dots 608 are formed on the upper surface of the counter substrate 607 to allow incident light on the liquid crystal by eliminating the requirement for the total internal reflections of light traveling through the substrate at the interface.

[Embodiment 2]

The present embodiment is a case where the structure of the reflection type liquid crystal panel is modified in the notebook-sized PC described in Embodiment 1.

Figure 7:
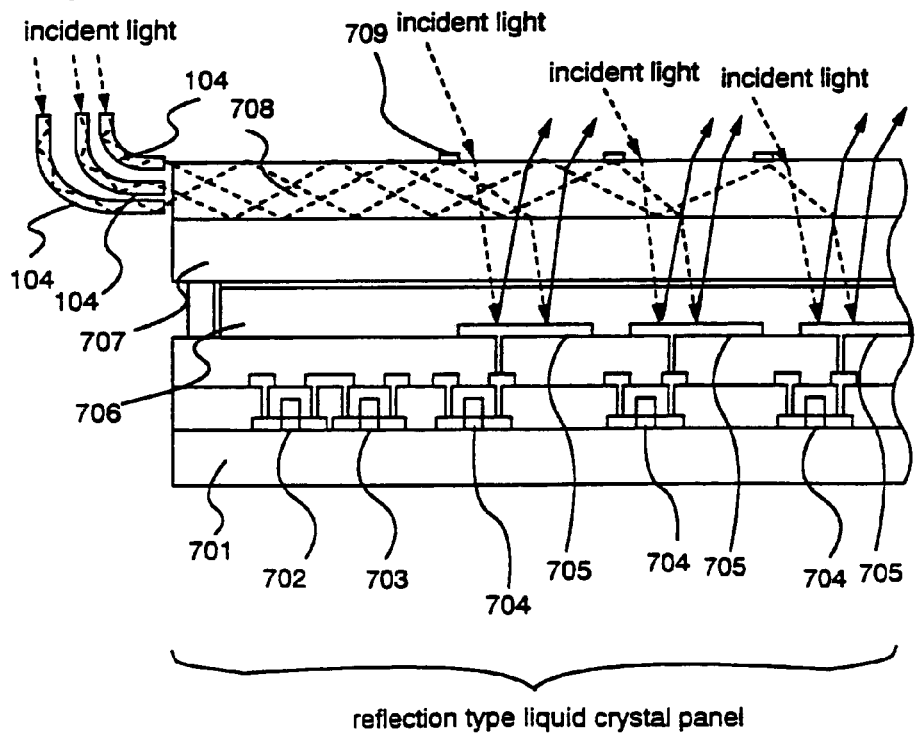
FIG. 7 is a sectional view of a reflection type liquid crystal panel according to the present invention.

Reference is made to FIG. 7, which shows a sectional view of the reflection type liquid crystal panel. Reference numeral 701 denotes a substrate. Reference numerals 702 and 703 are driver TFTs. Reference numerals 704, 705, 706, 707, and 708 denote a pixel TFT, a reflection electrode, liquid crystal, a counter substrate, and a light guide plate, respectively. Dots 709 are formed on the light guide plate 708.

In the present embodiment, again, light taken in the optical fiber cables 104 enters the light guide plate 708, traveling through the light guide plate 708, and then enters the liquid crystal 706.

[Embodiment 3]

The present embodiment is a case where the optical fiber cables are modified which form the optical fiber array used in the liquid crystal panel described in Embodiment 1 or Embodiment 2 as means for solving the above-mentioned problem.

Figure 8:
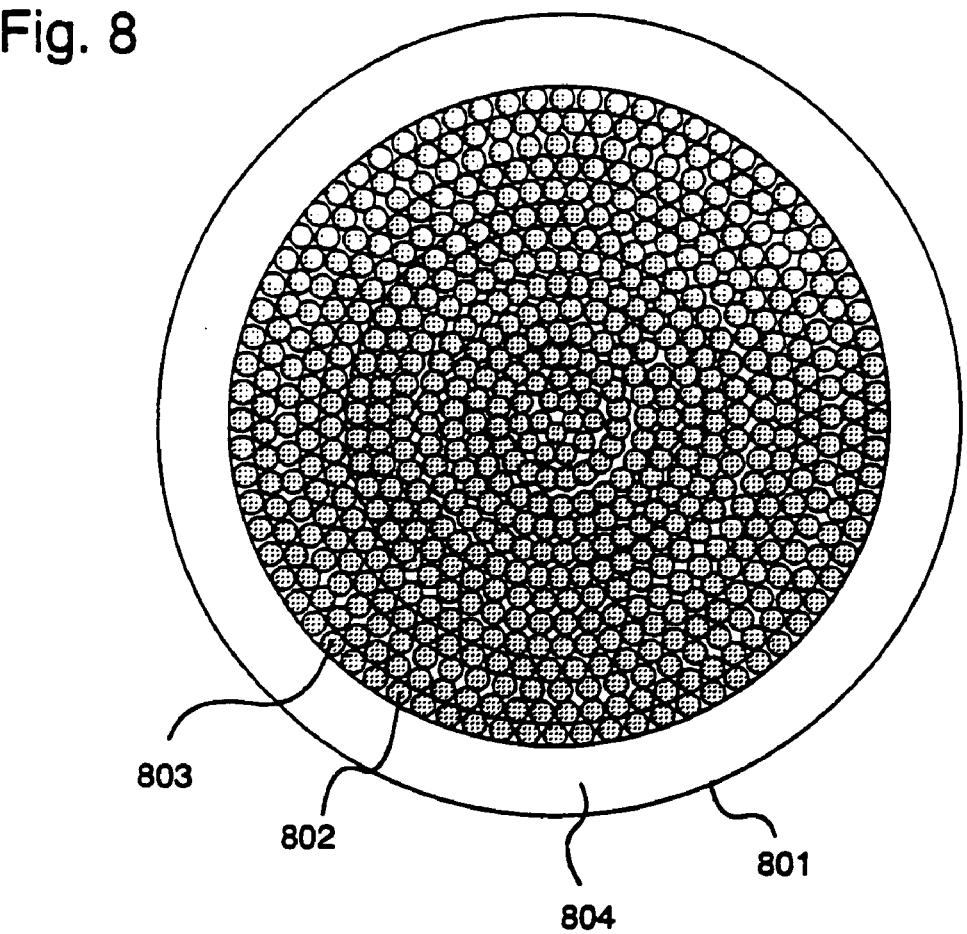
FIG. 8 shows an optical fiber cable.

The optical fiber array of the present embodiment is an aggregate of a plurality of optical fiber cables as shown in FIG. 8. Each of the optical fiber cables 801 is a bundle of a plurality of optical fibers 802. A microlens array 803 is positioned at an aperture of each optical fiber cable 801 for taking in the optical fibers. A coating 804 is formed of a resin or the like.

Figure 9:
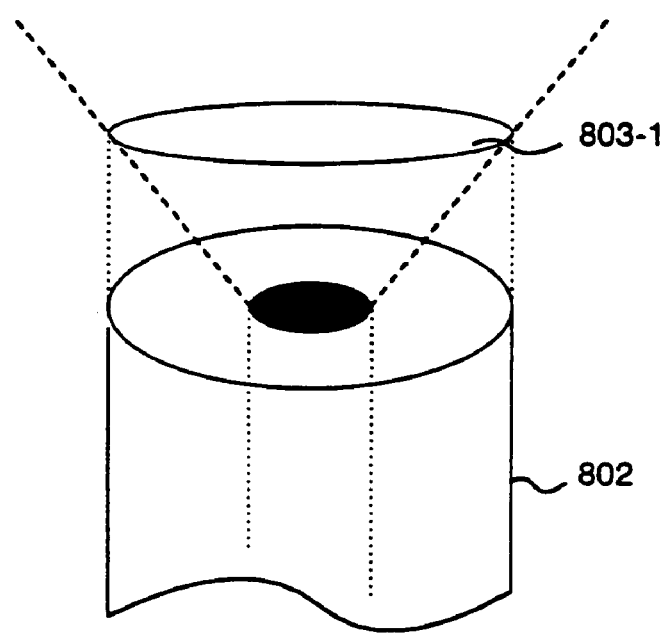
FIG. 9 shows an optical fiber and a microlens.

FIG. 9 illustrates the function of a microlens 803-1 forming the microlens array 803 of the present embodiment. The microlens array 803 is an aggregate of a plurality of microlenses 803-1. FIG. 9 shows one microlens 803-1 for conveniences' sake. The size of the microlens 803-1 substantially equals to that of the clad of the optical fiber 802. The microlens 803-1 is positioned such that incident light on the microlens 803-1 travels into the core of the optical fiber 802. Of course, the angle of incidence of light into the core of the optical fiber 802 is required to be set so as to cause total internal reflection. The structure of the present embodiment makes it possible to condense into the core the incident light on the clad of the optical fiber, which results in obtaining large amount of light even with a small area.

Figure 10:
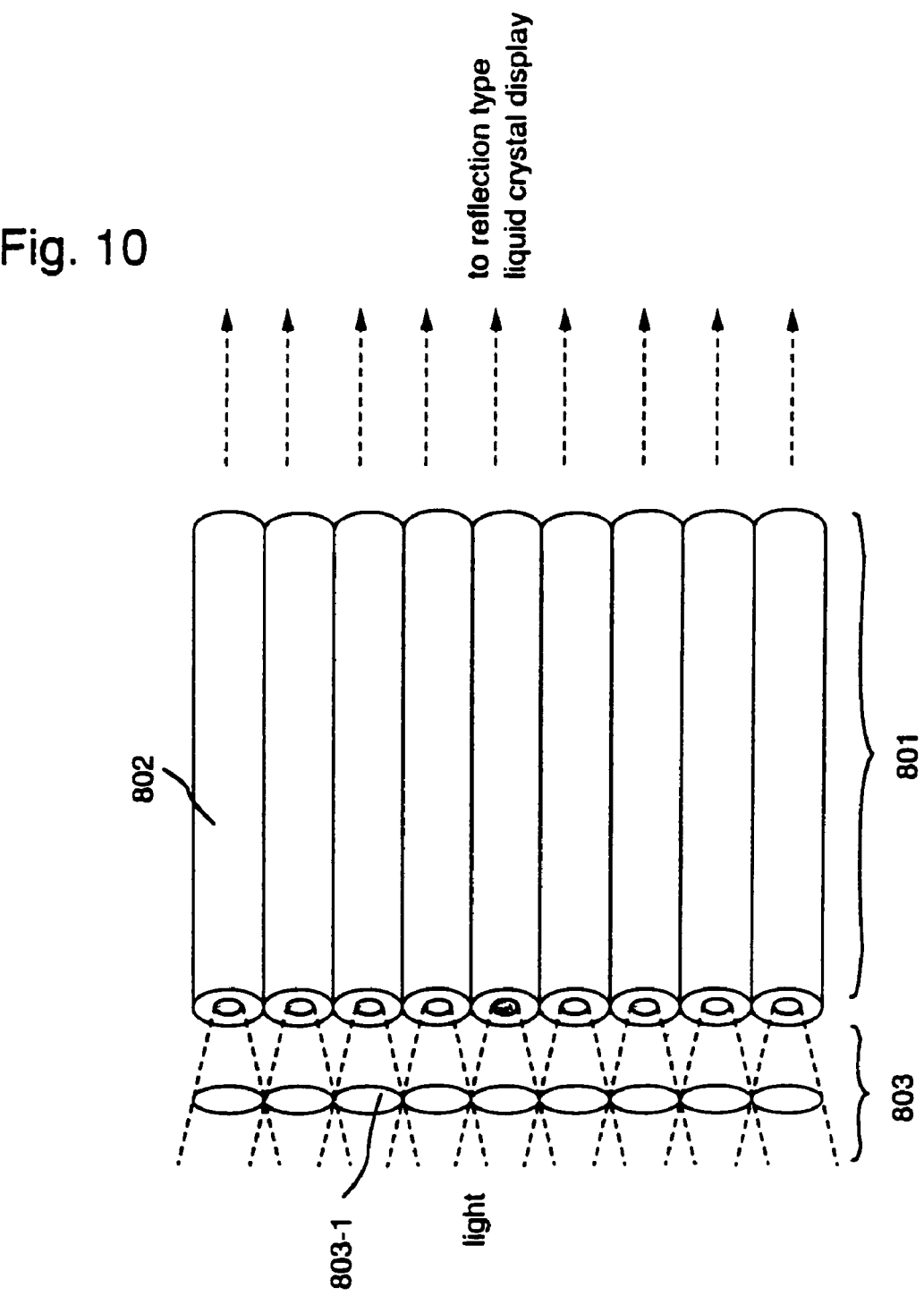
FIG. 10 shows an optical fiber array and a microlens array.

FIG. 10 schematically shows the positioning of the microlenses 803-1 correspondingly to the optical fibers 802 forming the optical fiber cable 801. It is to be noted that, in practice, in an optical fiber cable, the optical fibers 802 and the corresponding microlenses 803-1 thereto are of course disposed three-dimensionally.

[Embodiment 4]

The present embodiment is a case where the optical fiber cables are modified which form the optical fiber array used in the notebook-sized PC described in Embodiment 1 or Embodiment 2.

Figure 11:
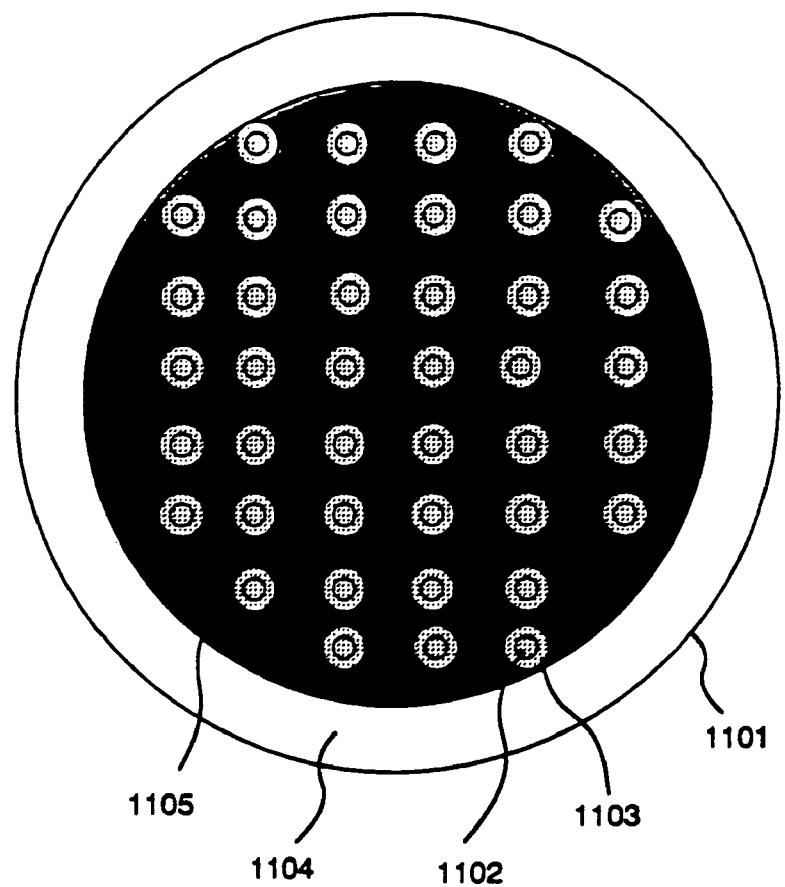
FIG. 11 shows an optical fiber cable.

Reference is made to FIG. 11. The optical fiber array of the present embodiment is an aggregate of a plurality of optical fiber cables 1101 as shown in FIG. 11. Each of the optical fiber cables 1101 is a bundle of a plurality of optical fibers 1102. A microlens array 1103 is positioned at an aperture of each optical fiber cable 1101 for taking in the optical fibers. A coating 1104 is formed of a resin or the like. A reinforcing material 1105 is formed of a resin or the like.

Figure 12:
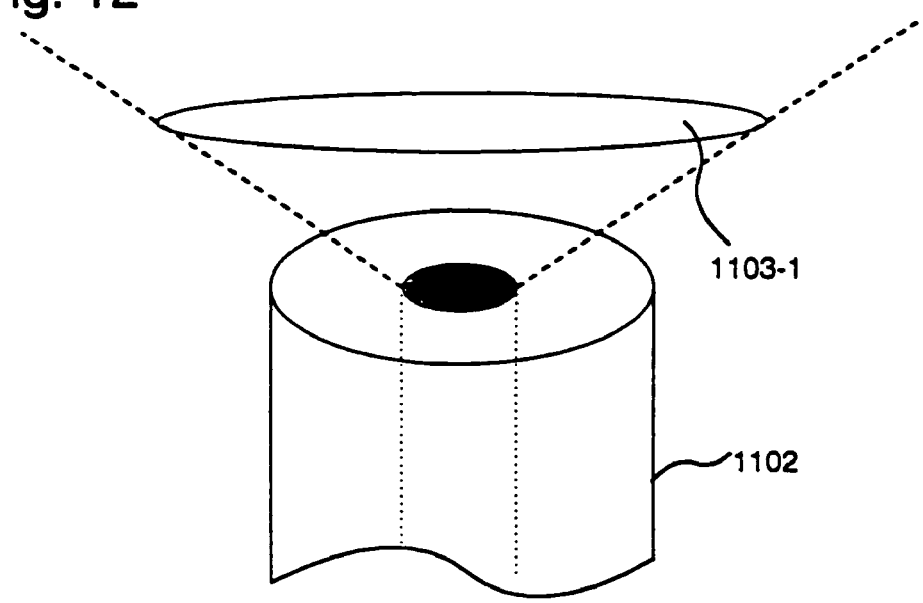
FIG. 12 shows an optical fiber and a microlens.

FIG. 12 shows a microlens 1103-1 forming the microlens array 1103 of the present embodiment. The microlens array 1103 is an aggregate of a plurality of microlenses 1103-1. FIG. 12 shows one microlens 1103-1 for conveniences' sake. The size of the microlens 1103-1 is larger than that of the clad of the optical fiber 1102. The microlens 1103-1 is positioned such that incident light on the microlens 1103-1 travels into the core of the optical fiber 1102. Of course, the angle of incidence of light into the core of the optical fiber 1102 is required to be set so as to cause total internal reflection. The structure of the present embodiment makes it possible to condense into the core the incident light on the microlens 1103-1, which results in obtaining large amount of light.

[Embodiment 5]

In the present embodiment, a notebook-sized PC is described having means for solving the above-mentioned problem or a plurality of the optical fiber arrays described in Embodiments 1–4.

Figure 13:
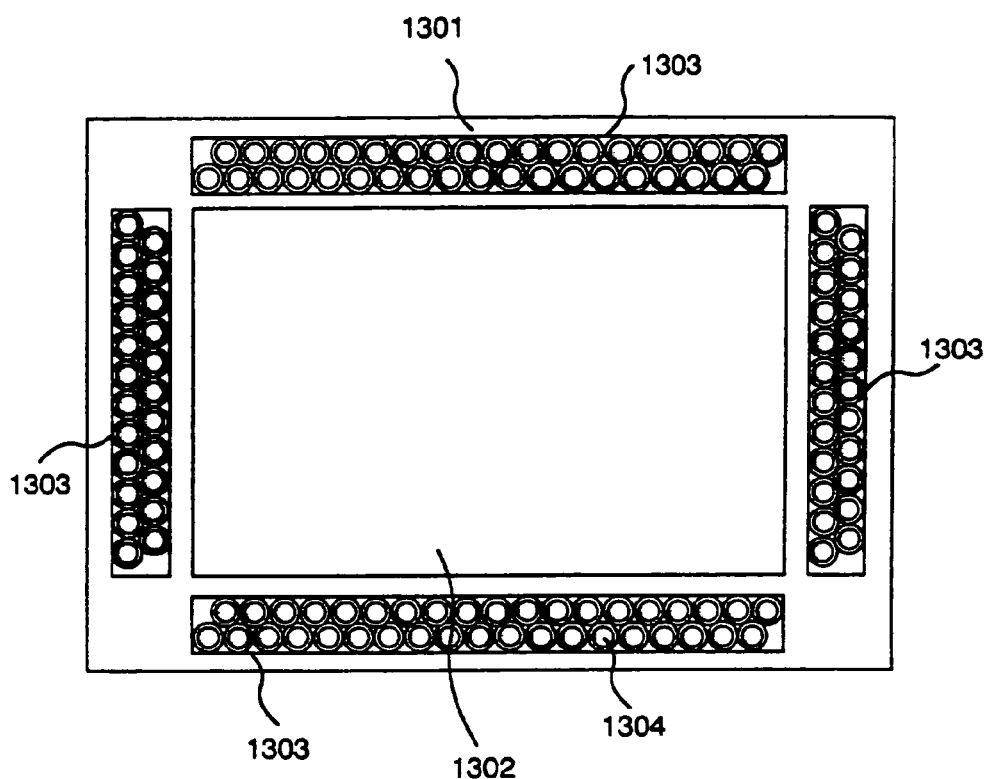
FIG. 13 is a schematic structural view of a reflection type semiconductor display device according to the present invention.

FIG. 13 is a schematic structural view of a reflection type semiconductor display device using a reflection type liquid crystal panel according to the present invention. Reference numerals 1301 and 1302 denote a main body and a reflection type liquid crystal panel, respectively. An optical fiber array 1303 has a plurality of optical fiber cables 1304. Though, in the present embodiment, four optical fiber arrays 1303 are used, but the number thereof may be more or less than four.

[Embodiment 6]

The present embodiment is a case where the structure of the reflection type liquid crystal panel described in the above embodiments further uses a front light as an auxiliary light source.

Figure 3:
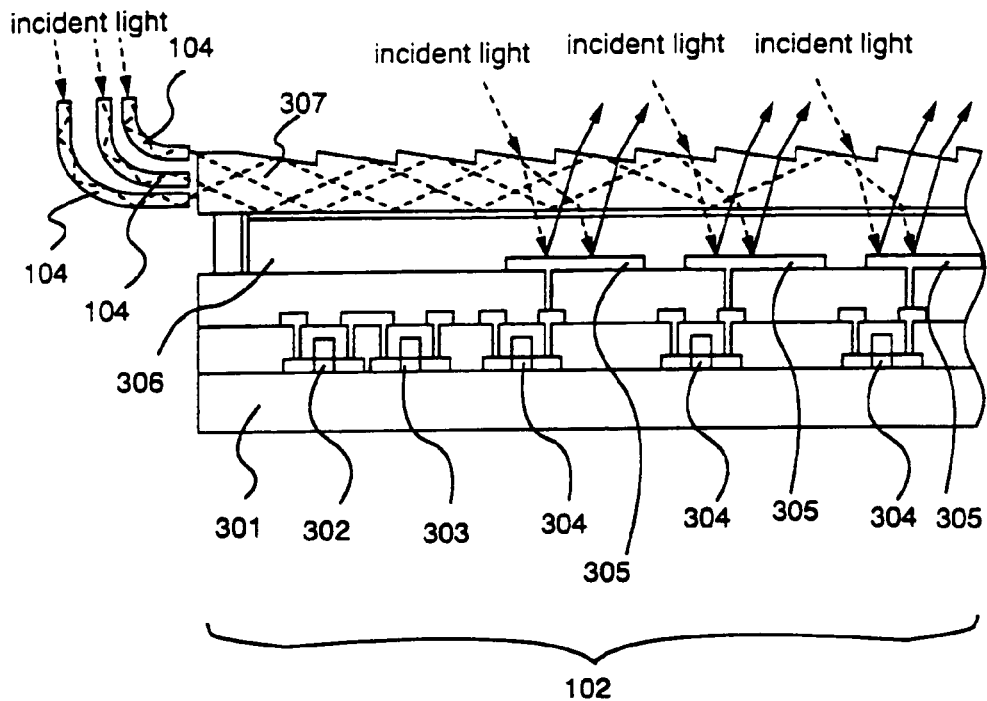
FIG. 3 is a sectional view of a reflection type liquid crystal panel according to the present invention.
Figure 4:
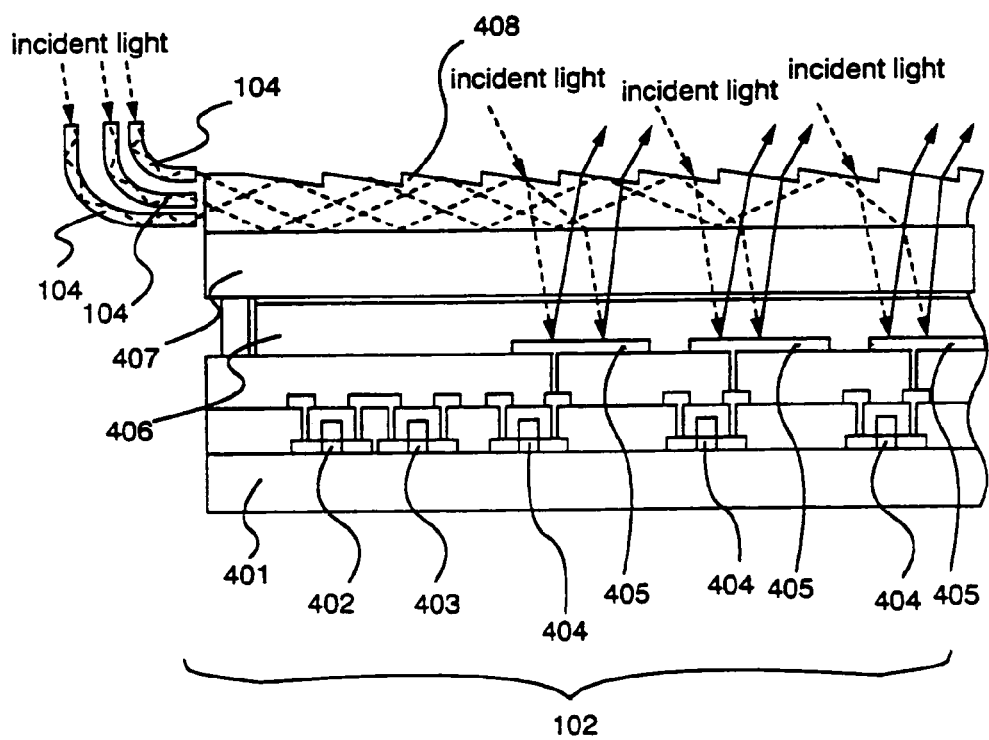
FIG. 4 is a sectional view of a reflection type liquid crystal panel according to the present invention.
Figure 14:
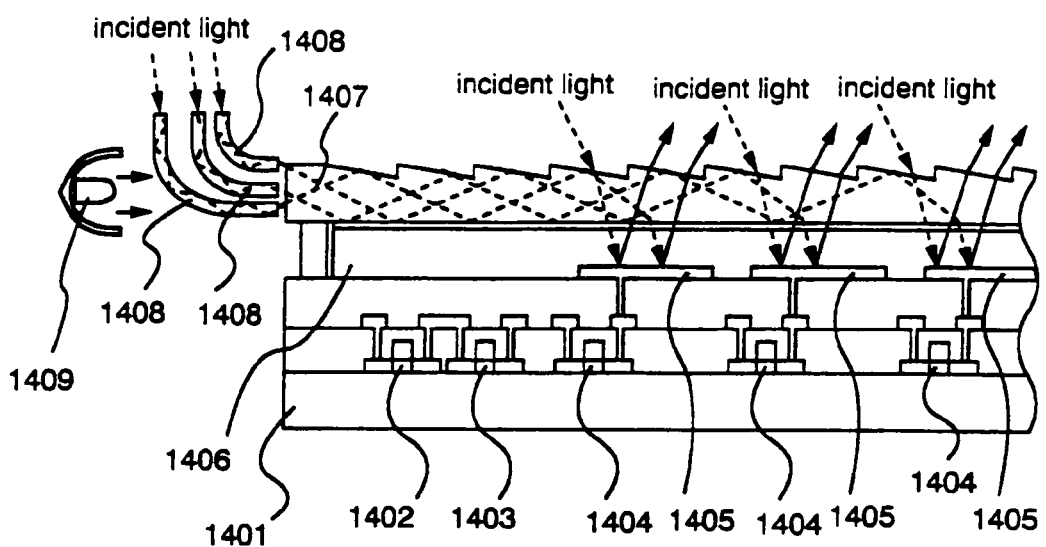
FIG. 14 is a sectional view of a reflection type liquid crystal panel according to the present invention.

FIG. 14 shows a sectional view of the reflection type liquid crystal panel of the present embodiment. Reference numeral 1401 denotes a substrate. Reference numerals 1402 and 1403 denote driver TFTs. Reference numerals 1404, 1405, and 1406 denote a pixel TFT, a reflection electrode, and liquid crystal, respectively. A counter substrate 1407 is similar to the counter substrate shown in FIG. 3. Reference numeral 1408 denotes an optical fiber cable. A front light 1409 is formed of a plurality of LEDs. Alternatively, the front light 1409 may be a fluorescent lamp.

Figure 15:
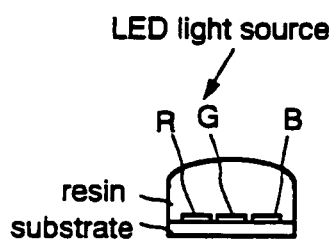
FIG. 15 shows LEDs used in a front light.

FIG. 15 shows LEDs forming the front light used in the present embodiment. LEDs for emitting R (red), G (green), and B (blue) light are integrally formed on a resin substrate to be used as a white light source.

In the present embodiment, in the case where auxiliary light from the optical fibers is not sufficient, the front light is lighted, and thus, the front light is normally set non-operational.

[Embodiment 7]

The semiconductor device using the reflective type liquid crystal panel provided with the auxiliary light source as the optical fiber array according to the present invention have various applications. In the present embodiment, such a semiconductor device will be described.

Semiconductor devices of this type include a video camera, a still camera, a car navigation system, a personal computer, and a portable information terminal (such as a mobile computer and a cellular telephone), examples of which are shown in FIGS. 16A to 16C and FIGS. 17A to 17E.

Figure 16A:
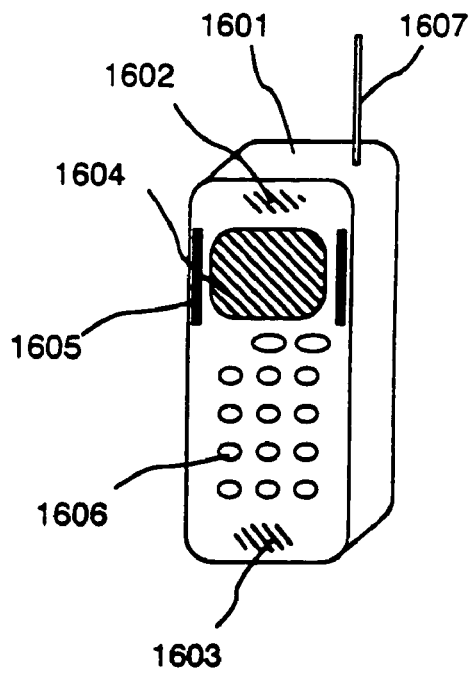
FIGS. 16A to 16C show examples of a semiconductor device with a reflection type liquid crystal panel according to the present invention mounted thereon.

FIG. 16A shows a cellular telephone formed of a main body 1601, a voice output portion 1602, a voice input portion 1603, a reflection type liquid crystal panel 1604, an optical fiber array 1605, a control switch 1606, and an antenna 1607.

Figure 16B:
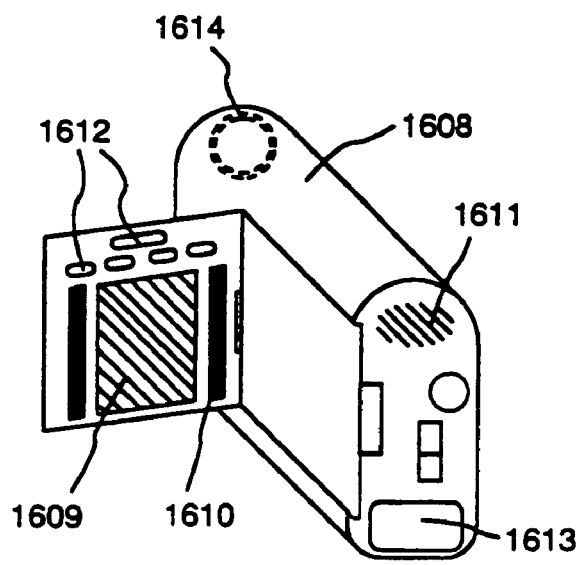

FIG. 16B shows a video camera formed of a main body 1608, a reflection type liquid crystal panel 1609, an optical fiber array 1610, a voice input portion 1611, a control switch 1612, a battery 1613, and an image reception portion 1614.

Figure 16C:
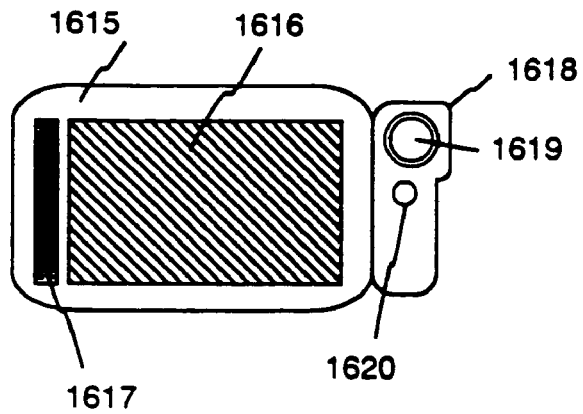

FIG. 16C shows a mobile computer formed of a main body 1615, a reflection type liquid crystal panel 1616, an optical fiber array 1617, a camera portion 1618, an image reception portion 1619, and a control switch 1620.

FIG. 17A shows a personal computer formed of a main body 2001, an image input portion 2002, a reflection type liquid crystal panel 2003, a keyboard 2004, and an optical fiber array 2005.

FIG. 17B shows a goggles type display formed of a main body 2101, a reflection type liquid crystal panel 2102, an arm portion 2103, and an optical fiber array 2104.

FIG. 17C shows a player using a recording medium with a program recorded therein (hereinafter referred to as a recording medium) and formed of a main body 2201, a reflection type liquid crystal panel 2202, a speaker portion 2203, a recording medium 2204, a control switch 2205, and an optical fiber array 2206. It is to be noted that, with this device, listening to music, watching movies, playing games, and enjoying Internet can be done with a DVD (digital versatile disc), a CD, or the like used as the recording medium.

FIG. 17D shows a digital camera formed of a main body 2301, a reflection type liquid crystal panel 2302, a viewfinder 2303, a control switch 2304, an optical fiber array 2305, and an image reception portion (not shown).

FIG. 17E shows a portable electronic book formed of a main body 2401, a reflection type liquid crystal panels 2402 and 2403, a recording medium 2404, a control switch 2405, an antenna 2406, and an optical fiber array 2407.

According to a reflection type semiconductor display device of the present invention, light other than incident light on a liquid crystal panel can be taken in to be an auxiliary light source using optical fibers, and thus, display of high quality level can be made even indoors or in a place where light is faint.

Further, by combining the semiconductor display device with a front light, insufficient amount of light can be supplemented with the front light.

What is claimed is:

1. A cellular telephone comprising a main body comprising:
   a first region comprising a display panel comprising:
      a first substrate having a first surface and a second surface;
      a second substrate having a third surface facing to the second surface;
      a thin film transistor over the second substrate; and
      a reflection electrode electrically connected to the thin film transistor;
   a second region; and
   an optical fiber having a first end and a second end, wherein:
   the first end faces to the first surface, and
   the second end is disposed adjacent to the second region.

2. A cellular telephone according to claim 1 wherein the display panel comprises a liquid crystal material between the first substrate and the second substrate.

3. A cellular telephone according to claim 1 wherein the second region comprising a microlens.

4. A video camera comprising a main body comprising:
   a first region comprising a display panel comprising:
      a first substrate having a first surface and a second surface;
      a second substrate having a third surface facing to the second surface;
      a thin film transistor over the second substrate; and
      a reflection electrode electrically connected to the thin film transistor;
   a second region; and
   an optical fiber having a first end and a second end, wherein:
   the first end faces to the first surface, and
   the second end is disposed adjacent to the second region.

5. A video camera according to claim 4 wherein the display panel comprises a liquid crystal material between the first substrate and the second substrate.

6. A video camera according to claim 4 wherein the second region comprising a microlens.

7. A personal computer comprising a main body comprising:
   a first region comprising a display panel comprising:
      a first substrate having a first surface and a second surface;
      a second substrate having a third surface facing to the second surface;
      a thin film transistor over the second substrate; and
      a reflection electrode electrically connected to the thin film transistor;
   a second region; and
   an optical fiber having a first end and a second end, wherein:
   the first end faces to the first surface, and
   the second end is disposed adjacent to the second region.

8. A personal computer according to claim 7 wherein the display panel comprises a liquid crystal material between the first substrate and the second substrate.

9. A personal computer according to claim 7 wherein the second region comprising a microlens.

10. A goggle type display comprising a main body comprising:
    a first region comprising a display panel comprising:
       a first substrate having a first surface and a second surface;
       a second substrate having a third surface facing to the second surface;
       a thin film transistor over the second substrate; and
       a reflection electrode electrically connected to the thin film transistor;
    a second region; and
    an optical fiber having a first end and a second end, wherein:
    the first end faces to the first surface, and
    the second end is disposed adjacent to the second region.

11. A goggle type display according to claim 10 wherein the display panel comprises a liquid crystal material between the first substrate and the second substrate.

12. A goggle type display according to claim 10 wherein the second region comprising a microlens.

13. A player comprising a main body comprising:
    a first region comprising a display panel comprising:
       a first substrate having a first surface and a second surface;
       a second substrate having a third surface facing to the second surface;
       a thin film transistor over the second substrate; and
       a reflection electrode electrically connected to the thin film transistor;
    a second region; and
    an optical fiber having a first end and a second end, wherein:
    the first end faces to the first surface, and
    the second end is disposed adjacent to the second region.

14. A player according to claim 13 wherein the display panel comprises a liquid crystal material between the first substrate and the second substrate.

15. A player according to claim 13 wherein the second region comprising a microlens.

16. A digital camera comprising a main body comprising:
    a first region comprising a display panel comprising:
       a first substrate having a first surface and a second surface;
       a second substrate having a third surface facing to the second surface;

a thin film transistor over the second substrate; and
a reflection electrode electrically connected to the thin film transistor;
a second region; and
an optical fiber having a first end and a second end, wherein:
the first end faces to the first surface, and
the second end is disposed adjacent to the second region.

17. A digital camera according to claim 16 wherein the display panel comprises a liquid crystal material between the first substrate and the second substrate.

18. A digital camera according to claim 16 wherein the second region comprising a microlens.

19. A portable electronic book comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region; and
an optical fiber having a first end and a second end, wherein:
the first end faces to the first surface, and
the second end is disposed adjacent to the second region.

20. A portable electronic book according to claim 19 wherein the display panel comprises a liquid crystal material between the first substrate and the second substrate.

21. A portable electronic book according to claim 19 wherein the second region comprising a microlens.

22. A cellular telephone comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

23. A cellular telephone according to claim 22 wherein the display panel comprises a liquid crystal material between the first substrate and the second substrate.

24. A cellular telephone according to claim 22 wherein the second region comprising a microlens.

25. A cellular telephone according to claim 22 wherein the front light comprises an LED.

26. A video camera comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

27. A video camera according to claim 26 wherein the display panel comprises a liquid crystal material between the first substrate and the second substrate.

28. A video camera according to claim 26 wherein the second region comprising a microlens.

29. A video- camera according to claim 26 wherein the front light comprises an LED.

30. A personal computer comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

31. A personal computer according to claim 30 wherein the display panel comprises a liquid crystal material between the first substrate and the second substrate.

32. A personal computer according to claim 30 wherein the second region comprising a microlens.

33. A personal computer according to claim 30 wherein the front light comprises an LED.

34. A goggle type display comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

35. A goggle type display according to claim 34 wherein the display panel comprises a liquid crystal material between the first substrate and the second substrate.

36. A goggle type display according to claim 34 wherein the second region comprising a microlens.

37. A goggle type display according to claim 34 wherein the front light comprises an LED.

38. A player comprising a main body comprising:
a first region comprising a display panel comprising:
a first substrate having a first surface and a second surface;
a second substrate having a third surface facing to the second surface;
a thin film transistor over the second substrate; and
a reflection electrode electrically connected to the thin film transistor;
a second region;

an optical fiber having a first end and a second end; and
a front light adjacent to the first substrate,
wherein:
the first end faces to the first surface, and
the second end is disposed adjacent to the second region.

39. A player according to claim 38 wherein the display panel comprises a liquid crystal material between the first substrate and the second substrate.

40. A player according to claim 38 wherein the second region comprising a microlens.

41. A player according to claim 38 wherein the front light comprises an LED.

42. A digital camera comprising a main body comprising:
a first region comprising a display panel comprising:
    a first substrate having a first surface and a second surface;
    a second substrate having a third surface facing to the second surface;
    a thin film transistor over the second substrate; and
    a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

43. A digital camera according to claim 42 wherein the display panel comprises a liquid crystal material between the first substrate and the second substrate.

44. A digital camera according to claim 42 wherein the second region comprising a microlens.

45. A digital camera according to claim 42 wherein the front light comprises an LED.

46. A portable electronic book comprising a main body comprising:
a first region comprising a display panel comprising:
    a first substrate having a first surface and a second surface;
    a second substrate having a third surface facing to the second surface;
    a thin film transistor over the second substrate; and
    a reflection electrode electrically connected to the thin film transistor;
a second region;
an optical fiber having a first end and a second end; and
a front light adjacent to the first substrate,
wherein:
the first end faces to the first surface, and
the second end is disposed adjacent to the second region.

47. A portable electronic book according to claim 46 wherein the display panel comprises a liquid crystal material between the first substrate and the second substrate.

48. A portable electronic book according to claim 46 wherein the second region comprising a microlens.

49. A portable electronic book according to claim 46 wherein the front light comprises an LED.

* * * * *